United States Patent Office 3,264,326
Patented August 2, 1966

3,264,326
17β-SUBSTITUTED-3α-AMINO-5α-ANDROSTANES
Donald E. Clark, Norristown, and Norman H. Grant, Wynnewood, Pa., assignors to American Home Products Corporation, New York, N.Y., a corporation of Delaware
No Drawing. Filed Apr. 29, 1964, Ser. No. 363,633
4 Claims. (Cl. 260—397)

This invention relates to new steroidal compounds. More particularly, this invention relates to new steroids of the androstane series and to the method by which they are prepared.

The new compounds of the present invention considered in their broadest aspect include those encompassed within the following formula:

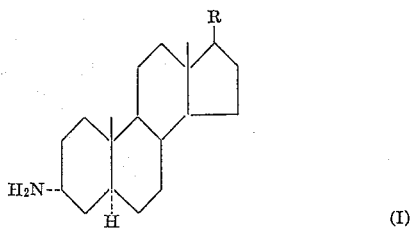

wherein R is selected from the group consisting of —NHCOCH$_3$ and —NH$_2$ together with the nontoxic, pharmacologically acceptable, acid addition salts thereof. The new compounds of the present invention are prepared by first reacting funtumine with hydrazoic acid, generated from sodium azide in the presence of HCl. The free base is then obtained by dissolving the resulting salt with aqueous base, such as sodium hydroxide. The product (wherein R=NHCOCH$_3$) then serves as an intermediate to the final product wherein R of Formula I is NH$_2$. The latter compound is obtained by hydrolysis of the 17β-acetamido by refluxing the latter with dilute mineral acid. The free base of the diamine is obtained by adjustment of the pH with base.

The reaction by which the new compounds of the present invention are obtained may be more readily understood by reference to the reaction sequence below:

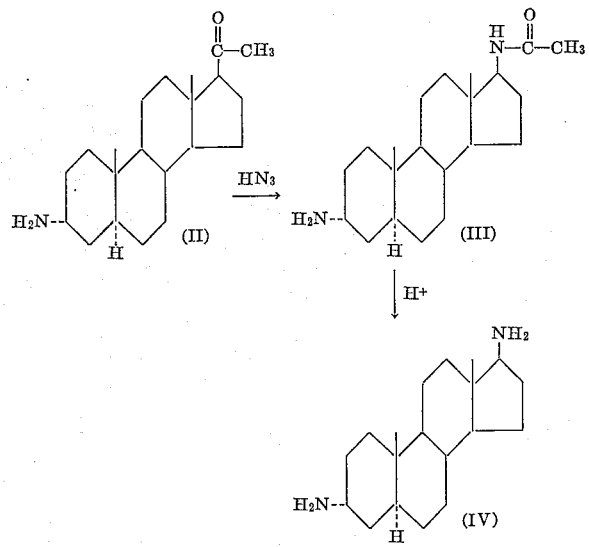

According to the foregoing sequence, a mixture of funtumine (II) and sodium azide in an inert solvent such as benzene is treated with HCl gas. After about ½ to 2 hours of stirring, the resulting precipitate (17β-acetamido-3α-amino-5α-androstane, III) is removed. It is washed, redissolved, acidified and evaporated to dryness. The free base is obtained on dissolving in water and neutralizing with base. Hydrolysis of III, by refluxing for a period of from about 10 to about 20 hours with dilute sulfuric acid results in the diamine IV. The free base of the diamine IV (5α-androstane-3α-17β-diamine) is precipitated by adjusting the pH to about 11.5 with base. The final product may then be purified according to conventional technique.

The funtumine starting material (II) is prepared according to the reaction described in Compt. rend. Acad. Sci. 240, 3076, 1958.

As described above, the new compounds of the present invention may be used in the form of their pharmaceutically acceptable acid addition salts. Such salts are obtained by conventional practice by treating the free base form of the compounds described with an acceptable organic or inorganic acid. Suitable acids for this purpose include hydrobromic, sulfuric, phosphoric, nitric, benzoic, methyl sulfonic, p-tolyl sulfonic, benzene sulfonic, naphthalene sulfonic, salicylic, glycolic, acetic, maleic, succinic, tartaric, stearic, palmitic, citric, glutaric, lactic and the like.

The new compounds of the present invention are useful and effective against a variety of microorganisms including both gram-positive and gram-negative species. Specifically, the new compounds of the present invention have been found to be effective against Bacillus subtilis, Escherichia coli, Staphylococcus aureus, Lactobacillus casei as well as other microorganisms. The effectiveness of these new compounds against the microorganisms identified has been measured according to standard and accepted test procedures.

Reference now to the specific examples which follow will provide a better understanding of the new compounds of the present invention and the manner in which they are prepared.

Example I

Anhydrous hydrogen chloride is bubbled through a mixture consisting of 5 grams of funtumine and 13.8 grams of sodium azide stirring at 11° C. in 50 ml. of benzene. After 40 minutes, the stirring is stopped, and the system chilled. The precipitate is collected, and washed first with aqueous sodium bicarbonate and then water. It is dissolved in ethanol, passed through a Dowex 1 (OH$^-$) column, acidified with aqueous hydrochloric acid, and evaporated to dryness. The free base is prepared from the hydrochloride by dissolving in water and neutralizing with sodium hydroxide. The resultant precipitate is washed with water and dried.

Example II

Hydrolysis of 17β-acetamido-3α-amino-5α-androstane is carried out by refluxing 1.8 grams for 11.5 hours in 5% H$_2$SO$_4$. The mixture is filtered, and the free base of the diamine is precipitated by adjusting the filtrate pH to 11.5 with NaOH. The precipitate, collected after chilling is washed with water, dissolved in ethanol, treated with gaseous HCl, evaporated to dryness, extracted into water, and finally evaporated to dryness, giving 1.1 grams of product.

While the foregoing invention has been described with some degree of particularity in the specific examples set forth above, it is to be understood that the invention is not to be limited thereby but is only to be limited by the claims appended hereto.

The invention claimed is:
1. 17β-acetamido-3α-amino-5α-androstane.
2. The method of preparing 17β-acetamido-3α-amino-

5α-androstane which comprises passing hydrogen chloride through a mixture of funtumine and sodium azide in the presence of an inert solvent, chilling the mixture and recovering the desired product.

3. The method of preparing 5α-androstane-3α,17β-diamine which comprises treating 17β-acetamido-3α-amino-5α-androstane with dilute acid, filtering the mixture and recovering the desired product by adjusting the filtrate pH to 11.5.

4. The non-toxic, pharmaceutically acceptable acid addition salts of the compound of claim 1.

References Cited by the Examiner

Crabbe et al.: Bull. Soc. Chim. Belg., 71 pp. 203–216 (1962), p. 208 relied on.

LEWIS GOTTS, *Primary Examiner.*

HENRY A. FRENCH, *Assistant Examiner.*